Dec. 6, 1960

L. H. VAN DYKE 2,962,823

TELEPHONE PAD HOLDER ATTACHMENT

Filed April 3, 1959

INVENTOR

Lyle H. Van Dyke

BY Ashley & Ashley

ATTORNEYS

United States Patent Office 2,962,823

Patented Dec. 6, 1960

2,962,823

TELEPHONE PAD HOLDER ATTACHMENT

Lyle H. Van Dyke, Dallas, Tex.
(P.O. Box 2364, Portland 14, Oreg.)

Filed Apr. 3, 1959, Ser. No. 803,996

6 Claims. (Cl. 40—337)

This invention relates to new and useful improvements in telephone pad holder attachments.

One object of the invention is to provide an improved pad holder which is so constructed that it may be attached to a dial telephone instrument without interfering with the operation and use of the instrument.

Another object of the invention is to provide improved means for attaching a pad holder to the finger stop of a dial telephone instrument whereby the holder may be mounted on the instrument and supported in a convenient position regardless of the construction or type of instrument.

A further object of the invention is to provide an improved holder for index and other pads having an extension projecting laterally from its base and carrying adjustable clip means for detachable connection with the finger stop of a dial telephone instrument, the extension and clip means being arranged to confine a portion of the finger stop therebetween to position the holder in substantially parallel relation to the face of the telephone instrument.

A construction designed to carry out the invention will be hereinafter described, together with other features of the invention.

Figures 1, 2, 3:
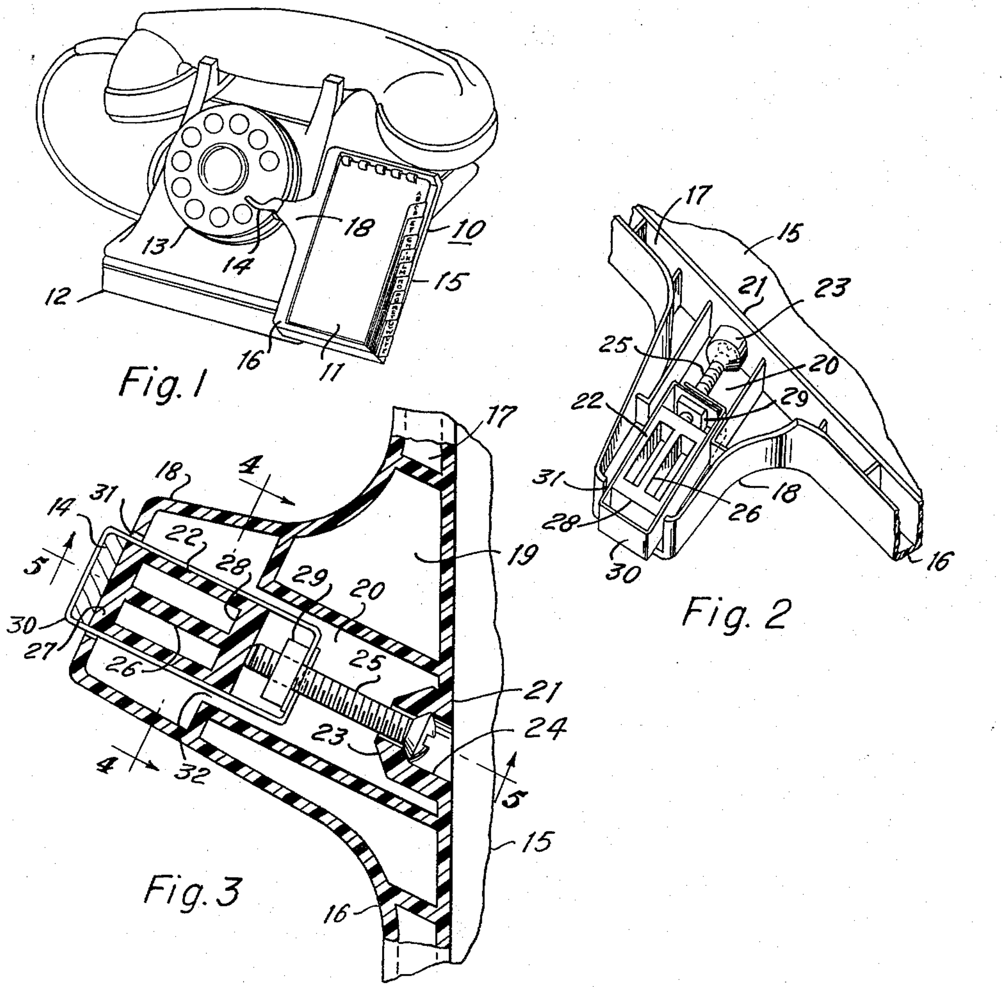
Figure 4:
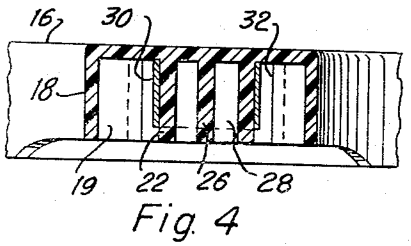
Figure 5:
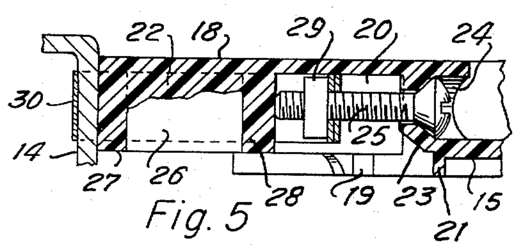

The invention will be more readily understood from a reading of the following specification and by reference to the accompanying drawing, wherein an example of the invention is shown, and wherein:

Fig. 1 is a perspective view of a pad holder constructed in accordance with the invention and attached to the finger stop of a telephone instrument, Fig. 2 is an enlarged, perspective view of the underside of the extension of the holder and its clip means, Fig. 3 is an enlarged, horizontal, cross-sectional view of the extension and clip means with a portion of the finger stop confined therebetween, Fig. 4 is a transverse, vertical, sectional view, taken on the line 4—4 of Fig. 3, and Fig. 5 is a transverse, vertical, sectional view, taken on the line 5—5 of Fig. 3.

This application is a continuation-in-part of my copending application Serial No. 717,396, filed February 27, 1958.

In the drawing, the numeral 10 designates a holder for an index or other pad 11 which is adapted to be mounted on a conventional telephone instrument 12 adjacent its dial 13 by attachment to the angular finger stop 14 of the dial. As shown more clearly in my co-pending application, supra, the holder includes a substantially rectangular base 15 in the form of a flat bottom plate or wall having a marginal flange or side wall 16. As shown in Figs. 2 and 3, the wall 16 is relatively wide or has appreciable transverse thickness and spaced recesses 17 or formed in its underside to facilitate molding of the holder of plastic or other suitable material.

In order to secure the holder 10 to the finger stop 14, a boss or extension 18 projects laterally outward from the medial portion of the wall 16 at an oblique angle substantially complementary to the angular position of said finger stop. As shown by the numeral 19, the underside of the extension 18 is recessed in the same manner as the wall of the base 15. A central groove or recess 20 extends longitudinally of the extension and has inner and outer, transverse end walls 21 and 22 (Fig. 3). The inner end wall 21 forms a continuation of the base wall 16 and has a substantially cylindrical boss 23 extending therefrom into the recess 20 to provide a countersunk socket 24 for receiving the head of a screw 25 which extends through the boss into said recess. The outer end wall 22 is relatively thick and is in the form of a rectangular block which is elongated longitudinally of the extension 18 and projects inwardly into its recess. As shown by the numeral 26, the underside of the outer wall is recessed to provide longitudinal ribs or portions extending between and reinforcing transverse portions 27 and 28. The screw 25 extends longitudinally through the recess 20 for bearing against the inner transverse portion 28 of the outer wall and has a nut 29 threaded thereon (Figs. 3 and 5).

A rectangular clip or ring 30, of suitable metal, has its flat inner end confined upon the screw 25 by the nut 29 and extends longitudinally of the recess 20 through slots or openings 31 and 32 in the transverse portions of the outer end wall 22. The clip 30 is of sufficient length to project outwardly of the extension 18 for engagement with the finger stop 14. Upon tightening of the screw, the clip is drawn inwardly into positive binding engagement with the finger stop to confine a portion of said stop between the flat outer end of said clip and the outer transverse portion 27 of the outer end wall of the extension. Due to the complementary angular relationship of the finger stop and outer end wall of the extension, the holder base 15 is mounted in close proximity to the telephone instrument 12 and has its longitudinal axis substantially parallel to the face of said instrument and particularly its dial 13 so as to facilitate the use of the support provided by the holder. Since the holder is attached to the finger stop, it may be readily mounted on a telephone instrument in a convenient position irrespective of the construction or type of telephone instrument and without interfering with the operation and use of said instrument.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An attachment for the base of a holder for index and other pads including an extension projecting laterally from one of the margins of the base, and clip means adjustably mounted on the extension for detachable connection with the finger stop of a dial telephone instrument, the clip means and extension having coacting surfaces for confining a portion of the finger stop therebetween, the surfaces extending at an oblique angle to the margin of the base and parallel to the confined portion of the finger stop to position the holder in substantially parallel relation to the face of the telephone instrument.

2. A pad holder attachment as set forth in claim 1 wherein the extension includes a longitudinal recess having inner and outer transverse end walls, a screw extending through the inner end wall into the recess for bearing against the outer end wall, and a nut threaded on the screw in said recess, the clip means being substantially rectangular and extending through said outer wall with its inner end portion confined in said recess and connected to said screw by the nut whereby said clip means is reciprocated upon rotation of said screw and has its outer end portion projecting from said extension for connection with the finger stop of the telephone instrument.

3. A pad holder attachment as set forth in claim 1 wherein the clip means is slidably supported by the extension, and means having connection with said clip means for reciprocating the same relative to said extension.

4. A pad holder attachment as set forth in claim 1 including a wall on one of the margins of the base and having the extension made integral therewith.

5. In a holder for index and other pads having a substantially flat and rectangular base, an extension projecting laterally from the medial portion of one margin of the base, a clip slidably supported by and projecting from the extension for detachable connection to the finger stop of a dial telephone instrument, and means carried by said extension for securing the clip in adjusted positions.

6. In a pad holder as set forth in claim 5 wherein the extension includes a longitudinal recess having inner and outer transverse end walls, the clip having a transverse end portion confined in the recess, the other transverse end portion of said clip overlying the outer end of said extension for confining a portion of the finger stop therebetween, the securing means extending through the inner end wall into said recess and having connection with said clip.

References Cited in the file of this patent

UNITED STATES PATENTS

| | | |
|---|---|---|
| 873,259 | Napp | Dec. 10, 1907 |
| 1,531,684 | Boix | Mar. 31, 1925 |